(12) United States Patent
Aminaka et al.

(10) Patent No.: US 10,660,010 B2
(45) Date of Patent: May 19, 2020

(54) WIRELESS TERMINAL APPARATUS, D2D CONTROLLER, AND METHOD

(71) Applicant: NEC Corporation, Tokyo (JP)

(72) Inventors: Hiroaki Aminaka, Tokyo (JP); Kazushi Muraoka, Tokyo (JP); Taichi Ohtsuji, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/572,683

(22) PCT Filed: Jan. 21, 2016

(86) PCT No.: PCT/JP2016/000294
§ 371 (c)(1),
(2) Date: Nov. 8, 2017

(87) PCT Pub. No.: WO2016/208096
PCT Pub. Date: Dec. 29, 2016

(65) Prior Publication Data
US 2018/0139684 A1 May 17, 2018

(30) Foreign Application Priority Data
Jun. 22, 2015 (JP) .................... 2015-124572

(51) Int. Cl.
*H04W 40/22* (2009.01)
*H04W 40/36* (2009.01)
(Continued)

(52) U.S. Cl.
CPC .......... *H04W 40/22* (2013.01); *H04W 40/36* (2013.01); *H04W 76/10* (2018.02); *H04W 88/04* (2013.01); *H04W 76/14* (2018.02)

(58) Field of Classification Search
None
See application file for complete search history.

(56) References Cited

U.S. PATENT DOCUMENTS

| 2013/0016645 A1* | 1/2013 | Moriwaki | H04L 12/185 370/312 |
| 2014/0219095 A1* | 8/2014 | Lim | H04W 72/085 370/235 |

(Continued)

FOREIGN PATENT DOCUMENTS

WO 2015047167 A1 4/2015

OTHER PUBLICATIONS

HTC, "Resolve FFS for the solution of Public safety discovery in clause 6.1", SA WG2 Meeting #107, Jan. 26-30, 2015, Sorrento, Italy, S2-150142 (Year: 2015).*

(Continued)

*Primary Examiner* — Joseph A Bednash
(74) *Attorney, Agent, or Firm* — Sughrue Mion, PLLC

(57) ABSTRACT

A wireless terminal apparatus (2) is configured, before the wireless terminal apparatus (2) is requested by another wireless terminal (1) or a D2D controller (5) to start a relay operation between the other wireless terminal (1) and the cellular network (3, 4), to hold connection information necessary to allow the other wireless terminal (1) to communicate with the cellular network (3, 4) or with a node (7) in an external network (6) via the relay operation performed by the wireless terminal apparatus (2). It is thus, for example, possible to contribute to reducing latency from when a mobile relay is requested to start a relay operation until the relay operation can be started.

16 Claims, 11 Drawing Sheets

(51) Int. Cl.
*H04W 76/10* (2018.01)
*H04W 88/04* (2009.01)
*H04W 76/14* (2018.01)

(56) References Cited

U.S. PATENT DOCUMENTS

| 2015/0146620 | A1 | 5/2015 | Phan et al. | |
| 2016/0198516 | A1* | 7/2016 | Kim | H04W 76/14 370/312 |
| 2016/0234806 | A1* | 8/2016 | Le Thierry D'Ennequin | H04W 4/06 |
| 2016/0278069 | A1* | 9/2016 | Lee | H04W 48/08 |
| 2018/0092017 | A1* | 3/2018 | Freda | H04W 76/14 |

OTHER PUBLICATIONS

"3rd Generation Partnership Project; Technical Specification Group Services and System Aspects; Proximity-based services (ProSe); Stage 2 (Release 12)", 3GPP TS 23.303 V12.4.0 (Mar. 2015), pp. 1-63.
Catt, "Resource Allocation for UE-to-Network relay operation", 3GPP TSG-RAN WG1 Meeting #81 R1-152574, May 16, 2015, pp. 1-5.
Ericsson, "Overview of ProSe UE to Network Relay & Service Continuity", 3GPP TSG-RAN WG1 Meeting #80bis R1-151765, Apr. 10, 2015, pp. 1-8.
Ericsson, "Measurements, Signaling, and Selection Rules for Relay Discovery", 3GPP TSG-RAN WG1 Meeting #80bis R1-151767, Apr. 10, 2015, pp. 1-7.
Intel, Alcatel-Lucent, "Consolidated description of solutions for ProSe Discovery using ProSe for ProSe Discovery using ProSe Communication capability {D3, D8, D7}", 3GPP TSG-SA WG2 Meeting #101 S2-140337, Jan. 14, 2014, pp. 1-11.
International Search Report of PCT/JP2016/000294 dated Mar. 29, 2016 [PCT/ISA/210].
Communication dated Sep. 10, 2019 from Japanese Patent Office in Application No. 2017-524567.

* cited by examiner

WIRELESS TERMINAL APPARATUS, D2D CONTROLLER, AND METHOD

CROSS REFERENCE TO RELATED APPLICATIONS

This application is a National Stage of International Application No. PCT/JP2016/000294, filed Jan. 21, 2016, claiming priority based on Japanese Patent Application No. 2015-124572, filed Jun. 22, 2015, the contents of all of which are incorporated herein by reference in their entirety.

TECHNICAL FIELD

The present disclosure relates to inter-terminal direct communication (device-to-device (D2D) communication) and, in particular, to a relay operation by a wireless terminal between another wireless terminal and a cellular network.

BACKGROUND ART

In some implementations, a wireless terminal is configured to communicate directly with another wireless terminal. Such communication is called device-to-device (D2D) communication. The D2D communication includes at least one of direct communication and direct discovery. In some implementations, a plurality of wireless terminals supporting the D2D communication form a D2D communication group autonomously, or under the control of a network, to communicate with another wireless terminal within the D2D communication group.

3GPP Release 12 defines Proximity-based services (ProSe) (see, for example, Non-Patent Literature 1). ProSe includes ProSe discovery and ProSe direct communication. ProSe discovery makes it possible to detect that wireless terminals are in proximity to each other. ProSe discovery includes direct discovery (i.e., ProSe direct discovery) and network-level discovery (i.e., EPC-level ProSe discovery).

ProSe direct discovery is performed through a procedure in which a wireless terminal capable of performing ProSe (i.e., ProSe-enabled User Equipment (UE)) discovers another ProSe-enabled UE by using only the capability of a radio communication technology (e.g., Evolved Universal Terrestrial Radio Access (E-UTRA) technology) possessed by these two UEs. On the other hand, in EPC-level ProSe discovery, a core network (i.e., Evolved Packet Core (EPC)) or a ProSe function (D2D controller 5) determines proximity of two ProSe-enabled UEs and informs these UEs of the detection of proximity. ProSe Direct Discovery may be performed by three or more ProSe-enabled UEs.

ProSe direct communication enables establishment of a communication path(s) between two or more ProSe-enabled UEs existing in a direct communication range after the ProSe discovery procedure is performed. In other words, ProSe direct communication enables a ProSe-enabled UE to directly communicate with another ProSe-enabled UE without traversing a public land mobile network (PLMN) including a base station (eNodeB). ProSe direct communication may be performed by using a radio communication technology that is also used to access a base station (eNodeB) (i.e., E-UTRA technology) or by using a wireless local area network (WLAN) radio technology (i.e., IEEE 802.11 radio technology).

ProSe direct discovery and ProSe direct communication are performed on a direct interface between UEs. This direct interface is referred to as a PC5 interface or a sidelink. That is, ProSe direct discovery and ProSe direct communication are examples of the D2D communication. The D2D communication can also be referred to as sidelink communication or may be referred to as peer-to-peer communication.

In 3GPP Release 12, a ProSe function communicates with a ProSe-enabled UE via a public land mobile network (PLMN) and assists ProSe Discovery and ProSe direct communication. The ProSe Function is a logical function that is used for PLMN-related operations required for ProSe. The functionality provided by the ProSe function includes, for example: (a) communication with third-party applications (ProSe Application Server), (b) authentication of a UE for ProSe Discovery and ProSe direct communication, (c) transmission of configuration information for ProSe Discovery and ProSe direct communication (e.g., EPC-ProSe-User ID) to a UE, and (d) providing of network-level discovery (i.e., EPC-level ProSe discovery). The ProSe function may be implemented in one or more network nodes or entities. In this specification, one or more network nodes or entities that implement the ProSe function are referred to as a "ProSe function entity" or a "ProSe function server".

3GPP Release 12 further defines a partial coverage scenario where one UE is located outside the network coverage, and another UE is located within the network coverage (see, for example, Sections 4.4.3, 4.5.4, and 5.4.4 in Non Patent Literature 1). In the partial coverage scenario, the UE outside the coverage is referred to as a "remote UE", and the UE that is in coverage and performs relaying between the remote UE and the network is referred to as a "ProSe UE-to-Network Relay". The ProSe UE-to-Network Relay relays traffic (downlink and uplink) between the remote UE and the network (E-UTRA network (E-UTRAN) and EPC).

More specifically, the ProSe UE-to-Network Relay attaches to the network as a UE, establishes a PDN connection to communicate with a ProSe function entity or another Packet Data Network (PDN), and communicates with the ProSe function entity to start ProSe Direct Communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay operates as a Dynamic Host Configuration Protocol Version 4 (DHCPv4) Server and Network Address Translation (NAT). When the IPv6 is used, the ProSe UE-to-Network Relay operates as a stateless DHCPv6 Relay Agent.

In this specification, a wireless terminal having D2D communication capability and relay capability such as the ProSe UE-to-Network Relay is referred to as a "mobile relay (MR)", a "mobile relay (MR) mobile terminal (MT))", or a "mobile relay UE (MR UE)". Further, a wireless terminal receiving a relay service by the mobile relay is referred to as a "remote mobile terminal (remote MT)" or a "remote UE".

CITATION LIST

Non Patent Literature

Non Patent Literature 1: 3GPP TS 23.303 V12.4.0 (March 2015), "3rd Generation Partnership Project; Technical Specification Group Services and System Aspects; Proximity-based services (ProSe); Stage 2 (Release 12)", March 2015

SUMMARY OF INVENTION

Technical Problem

The present inventors have studied about how to reduce processing latency when a remote terminal starts communication via a mobile relay. In one example, a case will be considered in which a remote terminal is directly connected to a cellular network in a cellular coverage, communicates with a node (e.g., application server) located in an external network via cellular communication, and then switches to communication via a mobile relay. This remote terminal preferably establishes a D2D communication path with the mobile relay when it moves outside the cellular coverage so that it can continue communication with the application server via D2D communication provided by the mobile relay and cellular communication. However, to start the relay operation by the mobile relay, the mobile relay may need not only to establish the D2D communication path but also to prepare a cellular communication path (i.e., bearer) for the relay operation or an application-layer connection with the node in the external network or both of them.

For example, in some implementations, in order to establish a bearer for transferring a data flow of the remote terminal in accordance with a policy (e.g., a Quality of Service (QoS) policy and a packet filter) required by the remote mobile terminal, the mobile relay may need to communicate with a control node in the cellular network (e.g., a base station or a Mobility Management Entity (MME)) and perform a bearer activation procedure (or a bearer modification procedure). Further, in some implementations, the mobile relay may need to perform an authentication procedure with the application server in order to communicate with the application server on behalf of the remote mobile terminal.

The above-described processing of the mobile relay for the preparation for the relay operation may cause latency from when the mobile relay is requested to start the relay operation until the relay operation can be started. One of the objects of embodiments disclosed herein is to provide an apparatus, a method, and a program that contribute to reducing the latency from when a mobile relay is requested to start a relay operation until the relay operation can be started.

Solution to Problem

In a first example aspect, a wireless terminal apparatus includes at least one wireless transceiver and at least one processor. The at least one processor is configured to perform cellular communication with a cellular network and device-to-device (D2D) communication with another wireless terminal using the at least one wireless transceiver. The at least one processor is further configured to, before the wireless terminal apparatus is requested by the other wireless terminal or a D2D controller to start a relay operation between the other wireless terminal and the cellular network, hold connection information necessary to allow the other wireless terminal to communicate with the cellular network or with a node in an external network via the relay operation performed by the wireless terminal apparatus.

In a second example aspect, a method in a wireless terminal apparatus including, before the wireless terminal apparatus is requested by another wireless terminal or a D2D controller to start a relay operation between the other wireless terminal and a cellular network, holding connection information necessary to allow the other wireless terminal to communicate with the cellular network or with a node in an external network via the relay operation performed by the wireless terminal apparatus.

In a third example aspect, a wireless terminal apparatus includes at least one wireless transceiver and at least one processor. The at least one processor is configured to perform cellular communication with a cellular network and device-to-device (D2D) communication with at least one wireless terminal using the at least one wireless transceiver. The at least one processor is further configured to, before the other wireless terminal is requested by the wireless terminal apparatus or a D2D controller to start a relay operation between the wireless terminal apparatus and the cellular network, transmit, to the other wireless terminal, connection information necessary to allow the wireless terminal apparatus to communicate with the cellular network or with a node in an external network via the relay operation performed by the other wireless terminal.

In a fourth example aspect, a method in a wireless terminal apparatus includes, before another wireless terminal is requested by the wireless terminal apparatus or a D2D controller to start a relay operation between the wireless terminal apparatus and a cellular network, transmitting, to the other wireless terminal, connection information necessary to allow the wireless terminal apparatus to communicate with the cellular network or with a node in an external network via the relay operation performed by the other wireless terminal.

In a fifth example aspect, a D2D controller includes a memory and at least one processor coupled to the memory. The at least one processor is configured to receive, from a second wireless terminal, connection information necessary to allow the second wireless terminal to communicate with a cellular network or with a node in an external network via a relay operation performed by a first wireless terminal between the second wireless terminal and the cellular network. The at least one processor is further configured to transmit the connection information to the first wireless terminal before the first wireless terminal is requested by the second wireless terminal or the D2D controller to start the relay operation.

In a sixth example aspect, a method in a D2D controller includes: (a) receiving, from a second wireless terminal, connection information necessary to allow the second wireless terminal to communicate with a cellular network or with a node in an external network via a relay operation performed by a first wireless terminal between the second wireless terminal and the cellular network; and (b) transmitting the connection information to the first wireless terminal before the first wireless terminal is requested by the second wireless terminal or the D2D controller to start the relay operation.

In a seventh example aspect, a program includes instructions (software codes) that, when loaded onto a computer, causes the computer to perform the method according to the above-described second, fourth, or sixth example aspect.

Advantageous Effects of Invention

According to the above example aspects, it is possible to provide an apparatus, a method, and a program that contribute to reducing latency from when a mobile relay is requested to start a relay operation until the relay operation can be started.

DESCRIPTION OF EMBODIMENTS

Hereinafter, specific embodiments of the present disclosure will be described in detail with reference to the drawings. The same or corresponding elements are denoted by the same signs throughout the drawings, and repeated descriptions will be omitted as necessary.

First Embodiment

Figure 1:
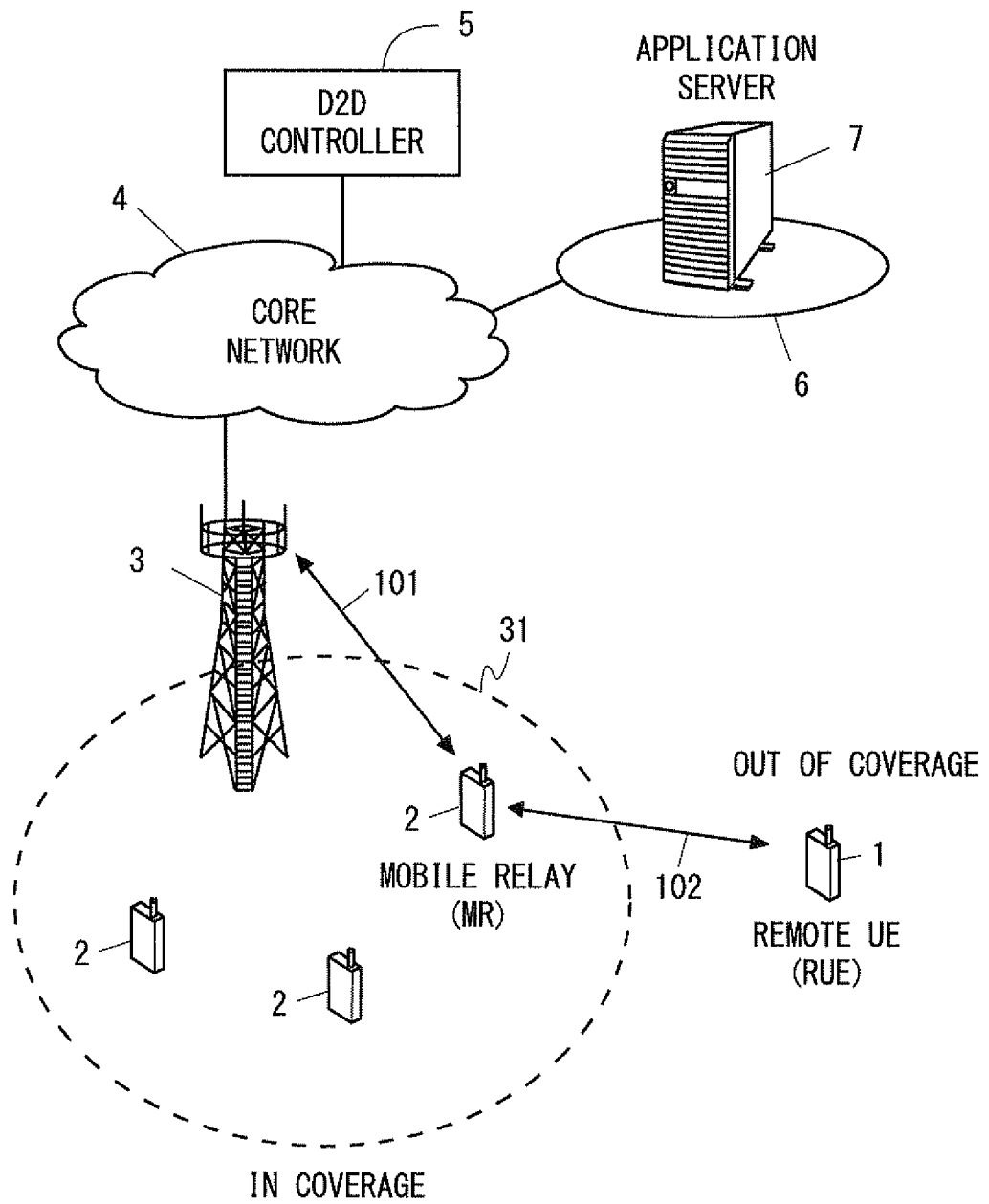
FIG. 1 is a diagram showing a configuration example of a wireless communication network according to a first embodiment.

FIG. 1 shows a configuration example of a wireless communication network according to this embodiment. A remote UE 1 includes at least one wireless transceiver and is configured to perform D2D communication (e.g., ProSe direct discovery and ProSe direct communication) with one or more mobile relays 2 on an inter-terminal direct interface (e.g., PC5 interface or sidelink) 102. Although not shown in FIG. 1, the remote UE 1 is configured to perform cellular communication in a cellular coverage 31 provided by one or more base stations 3.

The mobile relay 2 includes at least one wireless transceiver and is configured to perform cellular communication (101) with the base station 3 in the cellular coverage 31 and to perform D2D communication (e.g., ProSe direct discovery and ProSe direct communication) with the remote UE 1 on the inter-terminal direct interface 102 (e.g., PC5 interface or sidelink).

The base station 3 is an entity located in a wireless access network (i.e., E-UTRAN), provides the cellular coverage 31 including one or more cells and is able to perform communicate (101) with the mobile relay 2 using cellular communication technology (e.g., E-UTRA technology). The base station 3 is further configured to perform cellular communication with the remote UE 1 when the remote UE 1 is in the cellular coverage 31.

A core network (i.e., Evolved Packet Core (EPC)) 4 includes a plurality of user plane entities (e.g., Serving Gateway (S-GW) and Packet Data Network Gateways (P-GW)) and a plurality of control plane entities (e.g., Mobility Management Entity (MME) and Home Subscriber Server (HSS)). The user plane entities relay user data of the remote UE 1 and user data of the mobile relay 2 between an external network and a radio access network including the base station 3. The control plane entities perform various kinds of control for the remote UE 1 and the mobile relay 2 including mobility management, session management (bearer management), subscriber information management, and billing management.

In some implementations, in order to use a proximity-based service (e.g., 3GPP ProSe), the remote UE 1 and the mobile relay 2 are configured to communicate with the D2D controller 5 via the base station 3 and the core network 4. For example, in the case of 3GPP ProSe, the D2D controller 5 corresponds to a ProSe function entity. The remote UE 1 and the mobile relay 2 may use network-level discovery (e.g., EPC-level ProSe discovery) provided by the D2D controller 5, may receive from the D2D controller 5 a message indicating permission for the remote UE 1 and the mobile relay 2 to activate (enable) D2D communication (e.g., ProSe direct discovery and ProSe direct communication), and may receive from the D2D controller 5 configuration information regarding the D2D communication in the cellular coverage 31.

The mobile relay 2 provides the remote UE 1 with a relay operation between the remote UE 1 and the cellular network (i.e., the base station 3 and the core network 4). In other words, the mobile relay 2 relays a data flow (traffic) regarding the remote UE 1 between the remote UE 1 and the cellular network (the base station 3 and the core network 4). Accordingly, the remote UE 1 can communicate with a node (e.g., the application server 7) in the external network 6 via the mobile relay 2 and the cellular network (the base station 3 and the core network 4).

In the example of FIG. 1, the remote UE 1 is located outside the cellular coverage 31 (out of coverage). However, the remote UE 1 may be located in the cellular coverage 31 and be in a state of being unable to connect to the cellular network (the base station 3 and the core network 4) due to any conditions (e.g., selection by the user). The remote UE 1 performs D2D communication (e.g., direct communication) with the mobile relay 2 when the remote UE 1 cannot connect to the cellular network (e.g., out of coverage).

For the sake of convenience of explanation, in the present specification, the D2D communication between the remote UE 1 and the mobile relay 2 is referred to as "D2D communication in a partial coverage" for the sake of convenience. However, the "D2D communication in a partial coverage" used herein includes sidelink communication between the remote UE 1 and the mobile relay 2 when the remote UE 1 is unable to connect to the cellular network due to various reasons.

It may be determined that the remote UE 1 is unable to connect to the cellular network when reception quality (e.g., Reference Signal Received Power (RSRP) or Reference Signal Received Quality (RSRQ)) of a radio signal transmitted from one or more base stations 3 in the cellular network is less than or equal to a predetermined threshold.

In other words, the remote UE 1 may determine that it cannot connect to the cellular network in response to detecting that it has not successfully received a radio signal from the cellular network. Alternatively, the remote UE 1 may determine that it cannot to connect to the cellular network in response to detecting that a connection (or attach) to the cellular network has been rejected although it can receive a radio signal from any base station 3. Alternatively, the remote UE 1 may determine that it cannot to connect to the cellular network in response to detecting that it has forcibly disconnected or deactivated its connection to the cellular network in accordance with an instruction from the user or from a control node (e.g., the base station 3, the D2D controller 5, or an Operation Administration and Maintenance (OAM) server) in the cellular network.

Hereinafter, a procedure for starting the relay operation according to this embodiment will be described with reference to FIGS. 2 to 7. The mobile relay 2 according to this embodiments is configured to hold connection information regarding the relay operation from the remote UE 1 or the D2D controller 5 before it is requested by the remote UE 1 or the D2D controller 5 to start the relay operation by the mobile relay 2 between the remote UE 1 and the cellular network (the base station 3 and the core network 4). The connection information includes configuration information necessary to allow the remote UE 1 to communicate with the cellular network or with a node (e.g., the application server 7) in the external network 6 via the relay operation performed by the mobile relay 2 between the remote UE 1 and the cellular network (the base station 3 and the core network 4).

For example, the connection information may include configuration information regarding a bearer (e.g., Evolved Packet System (EPS) bearer) in the cellular network that transfers a data flow of the remote UE 1. The configuration information regarding a bearer may specify, for example, at least one of a Quality of Service (QoS) policy of the bearer and a packet filter for the bearer.

Additionally or alternatively, the connection information may include configuration information necessary for the remote UE 1 to communicate with a node (e.g., the application server 7) in the external network 6 on the application layer. The configuration information regarding application layer communication may include, for example, at least one of: an identifier (e.g., Uniform Resource Locator (URL)) of the node in the external network 6; an address (e.g., an Internet Protocol (IP) address, or a session ID (i.e., a combination of an IP address and a Transmission Control Protocol (TCP) port number)); and authentication information (e.g., user ID and password) for accessing the node.

In some implementations, the mobile relay 2 may be configured to prepare a communication path for the relay operation in accordance with the connection information before it is requested to start the relay operation for the remote UE 1. For example, before the mobile relay 2 is requested to start the relay operation for the remote UE 1, it may perform the bearer activation procedure or bearer modification procedure with the cellular network in accordance with the connection information to prepare a bearer in the cellular network to transfer a data flow of the remote UE 1. Additionally or alternatively, before the mobile relay 2 is requested to start the relay operation for the remote UE 1, it may establish a state capable of communicating with a node (e.g., the application server 7) in the external network 6 in accordance with the connection information.

In some implementations, in response to receiving the connection information, the mobile relay 2 may start preparing the communication path for the relay operation in accordance with the connection information. Alternatively, in response to receiving an instruction from the D2D controller 5 after receiving the connection information, the mobile relay 2 may start preparing the communication path for the relay operation in accordance with the connection information. Further alternatively, in response to receiving an instruction (e.g., a discovery signal) from the remote UE 1 after receiving the connection information, the mobile relay 2 may start preparing the communication path for the relay operation in accordance with the connection information.

In some implementations, the mobile relay 2 may receive the above-described connection information when it is designated as one of at least one mobile relay candidate (MR candidate) for the remote UE 1 and may start preparing the communication path for the relay operation in accordance with the connection information. Note that the term "mobile relay candidate" means a wireless terminal that has been asked to prepare for the relay operation for the remote UE 1 based on the connection information, but has not yet been requested to start the relay operation. As described above, the preparation of the communication path based on the connection information may include at least one of: the bearer activation procedure (or the bearer modification procedure) with the core network 4; and the authentication procedure with the application server 7. Here, the bearer activation procedure is a procedure for configuring a new dedicated bearer, and on the other hand the bearer modification procedure is a procedure for changing the policy of a bearer that has already been configured. Further, the mobile relay (candidate) 2 may be configured to start the relay operation using the communication path, which has already been prepared, in response to receiving from the remote UE 1 or the D2D controller 5 a relay start request resulting from the designation of the mobile relay (candidate) 2 as one of the at least one mobile relay candidate for the remote UE 1. In one example, the mobile relay (candidate) 2 may receive the relay start request after it is designated as one of the at least one mobile relay candidate for the remote UE 1.

As understood from the above description, in this embodiment, the remote UE 1 or the D2D controller 5 is configured to, before the remote UE 1 or the D2D controller 5 requests the mobile relay 2 to start the relay operation between the remote UE 1 and the cellular network, transmit to the mobile relay 2 the connection information necessary to allow the remote UE 1 to communicate with the cellular network or with a node in the external network 6 via the relay operation performed by the mobile relay 2. Meanwhile, the mobile relay 2 is configured to receive the connection information regarding the relay operation from the remote UE 1 or the D2D controller 5, before the mobile relay 2 is requested by the remote UE 1 or the D2D controller 5 to start the relay operation by the mobile relay 2 between the remote UE 1 and the cellular network (the base station 3 and the core network 4). In other words, the mobile relay 2 is configured to hold the connection information regarding the relay operation before it is requested to start the relay operation. Accordingly, the mobile relay 2 can start preparing the communication path for the relay operation in accordance with the connection information before it is requested to start the relay operation for the remote UE 1. As described above, the preparation of the communication path may include at least one of: the bearer activation procedure (or the bearer modification procedure) with the core network 4; and the authentication procedure with the application server 7. By preparing the communication path for the relay operation in advance, the mobile relay 2 can reduce latency from when it is requested to start the relay operation until the relay operation can be started. Therefore, the remote UE 1, the mobile relay 2, and the D2D controller 5 according to this embodiment can contribute to reducing latency from when the mobile relay 2 is requested to start the relay operation until the relay operation can be started.

Figure 2:
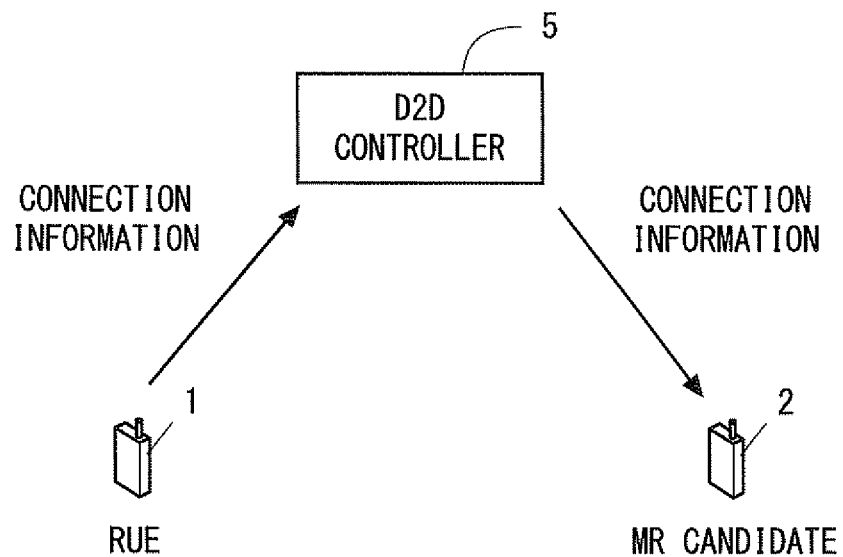
FIG. 2 is a diagram for describing an example of an operation performed by a remote mobile terminal, a mobile relay, and a D2D controller according to the first embodiment.

The following provides other details about the procedure for starting the relay operation according to this embodiment. In some implementations, as shown in FIG. 2, the remote UE (RUE) 1 may transmit the connection information to the D2D controller 5, and the D2D controller 5 may forward the connection information received from the remote UE 1 to the mobile relay 2 as a mobile relay candidate (MR candidate). In other words, the remote UE 1 may transmit the connection information to the mobile relay (candidate) 2 via the D2D controller 5. In one example, the remote UE 1 may transmit the connection information necessary for the relay operation to the mobile relay (candidate) 2 via the D2D controller 5 in response to detecting degradation in the communication quality (e.g., RSRP or RSRQ) of the cellular network. Alternatively, the remote UE 1 may transmit the connection information to the mobile relay (candidate) 2 via the D2D controller 5 when it completes the connection to the cellular network or at any time while the remote UE 1 is connected to the cellular network.

Figure 3:
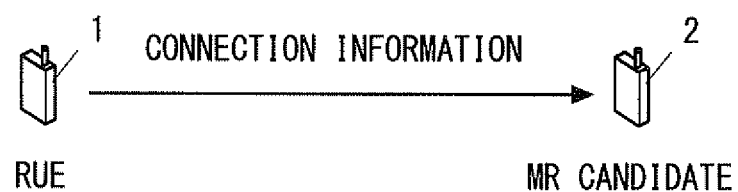
FIG. 3 is a diagram for describing an example of an operation performed by the remote mobile terminal and the mobile relay according to the first embodiment.

In some implementations, as shown in FIG. 3, the remote UE (RUE) 1 may transmit the connection information directly to the mobile relay (candidate) 2 in the D2D communication with the mobile relay (candidate) 2. In one example, in response to detecting degradation in the communication quality (e.g., RSRP or RSRQ) of the cellular network, the remote UE 1 may transmit to the mobile relay (candidate) 2, via the D2D communication, the connection information necessary for the relay operation. Alternatively, the remote UE 1 may transmit to the mobile relay (candidate) 2, via the D2D communication, the connection information necessary for the relay operation at any time while the remote UE 1 can use the cellular communication and also can use the D2D communication with the mobile relay (candidate) 2.

Figure 4:
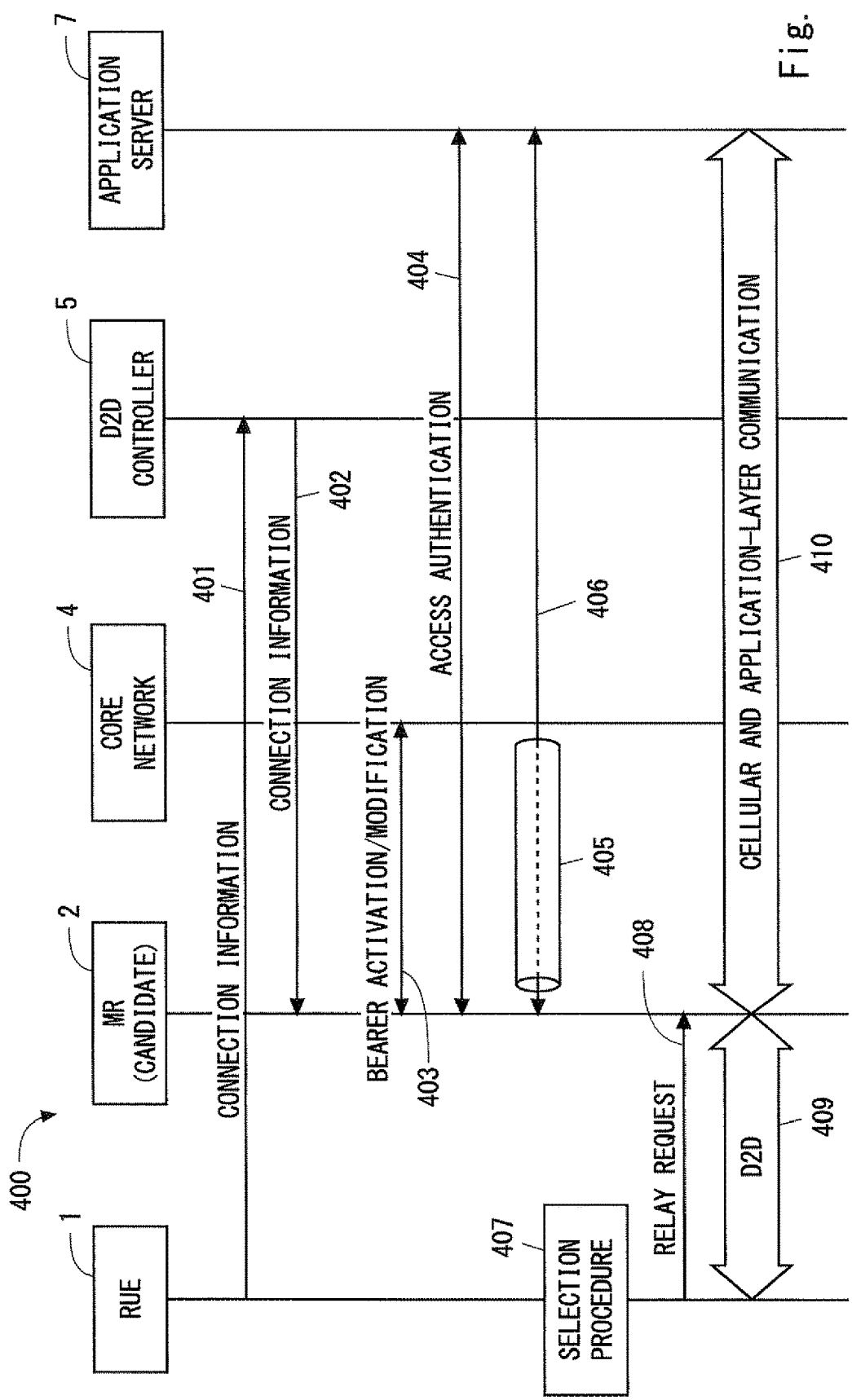
FIG. 4 is a sequence diagram showing an example of a procedure for starting a relay operation according to the first embodiment.

FIG. 4 is a sequence diagram showing an example (process 400) of a procedure for starting the relay operation according to this embodiment. In the example of FIG. 4, the remote UE 1 transmits the connection information to the mobile relay (candidate) 2 via the D2D controller 5. That is, in block 401, the remote UE 1 transmits the connection information to the D2D controller 5. In block 402, the D2D controller 5 transmits the connection information received from the remote UE 1 to the mobile relay (candidate) 2.

In blocks 403 and 404, the mobile relay (candidate) 2 prepares a communication path to be used for the relay operation for the remote UE 1 in accordance with the received connection information. That is, in block 403, the mobile relay (candidate) 2 communicates with the core network 4 and performs the bearer activation procedure or bearer modification procedure to prepare a bearer corresponding to the policy (e.g., the QoS policy and the packet filter) required by the data flow of the remote UE 1. As described above, the bearer activation procedure is a procedure for configuring a new dedicated bearer, and on the other hand the bearer modification procedure is a procedure for changing the policy of a bearer that has already been configured.

In block 404, the mobile relay (candidate) 2 communicates with the application server 7 in the external network 6 and performs the authentication procedure to communicate with the application server on behalf of the remote UE 1. By doing so, a bearer 405 used for the relay operation for the remote UE 1 and a connection 406 between the mobile relay (candidate) 2 and the application server 7 are established. The connection 406 may be a connection on the application layer (session) or a connection on the TCP/IP layer. The example in FIG. 4 is merely illustrative. For example, the mobile relay (candidate) 2 may establish only the bearer 405 without establishing the connection 406 with the application server 7.

In block 407, in response to satisfying the condition for starting the D2D communication, the remote UE 1 performs a procedure for selecting a mobile relay and selects the mobile relay 2. In block 408, the remote UE 1 transmits a start request for the relay operation (e.g., relay request) to the mobile relay 2 via the D2D communication. In some implementations, the remote UE 1 may select a wireless terminal to be actually requested for the relay operation from among a plurality of mobile relay candidates including the mobile relay (candidate) 2, and then transmit a relay request to the selected wireless terminal. The remote UE 1 may compare the reception quality of radio signals from the plurality of mobile relay candidates, and then select as the mobile relay the wireless terminal that has provided the best reception quality. Alternatively, the remote UE 1 may perform the direct discovery procedure and select the wireless terminal to request the relay operation from among at least one wireless terminal that has been discovered.

In response to the relay request, the mobile relay (candidate) 2 starts the direct communication with the remote UE 1, activates a connection with the cellular network as necessary, and starts the relay operation between the remote UE 1 and the cellular network (the base station 3 and the core network 4) (409 and 410).

Figure 5:
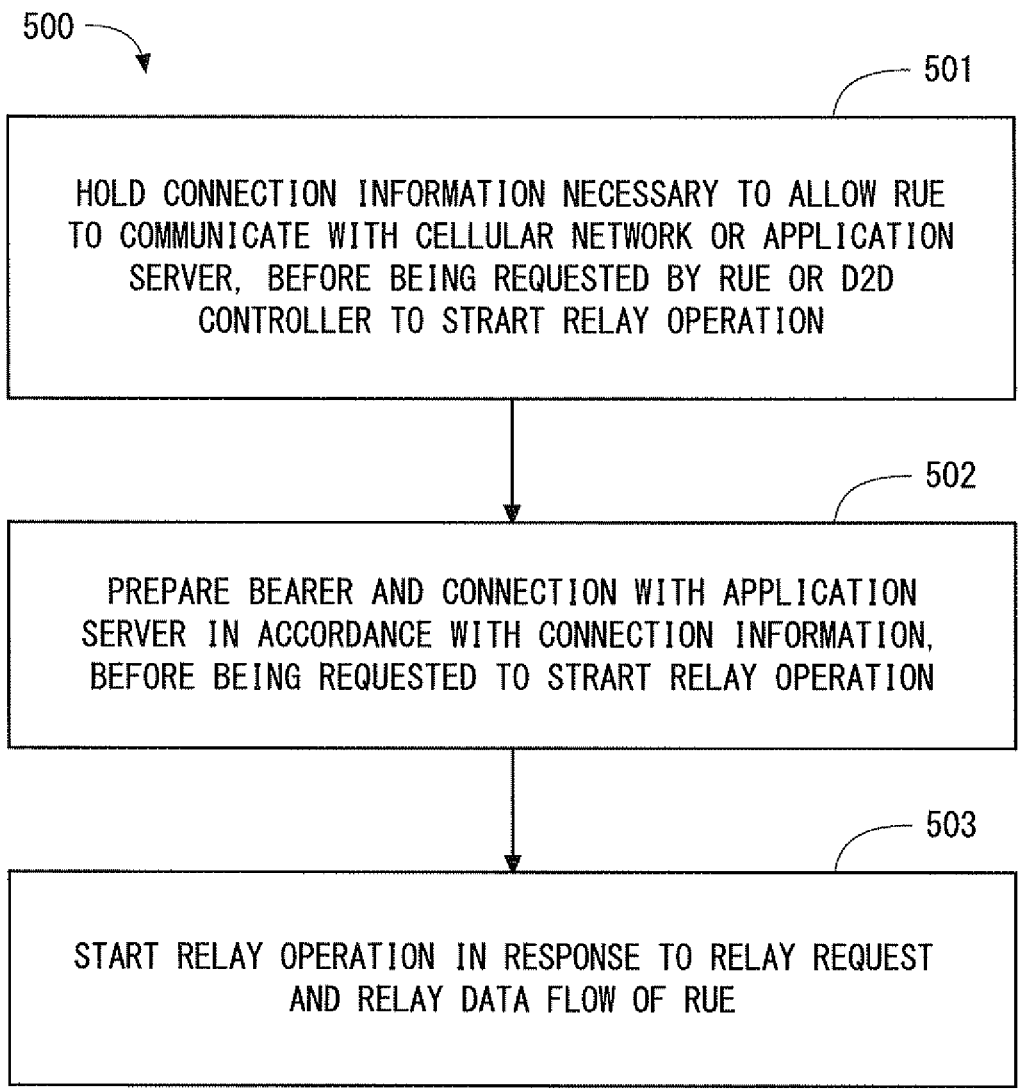
FIG. 5 is a flowchart showing an example of an operation of the mobile relay according to the first embodiment.

FIG. 5 is a flowchart showing an example (process 500) of the operation of the mobile relay (candidate) 2. In block 501, the mobile relay (candidate) 2 holds the connection information necessary to allow the remote UE (RUE) 1 to communicate with the cellular network (the base station 3 and the core network 4) or the application server 7 before it is requested by the RUE 1 or the D2D controller 5 to start the relay operation. In block 502, before being requested to start the relay operation, the mobile relay (candidate) 2 prepares a bearer in the cellular network and a connection to the application server 7 according to the policy of the RUE 1 in accordance with the connection information. In block 503, the mobile relay (candidate) 2 starts the relay operation in response to receiving a relay request from the RUE 1 or the D2D controller 5, and relays the data flow of the RUE 1.

Figure 6:
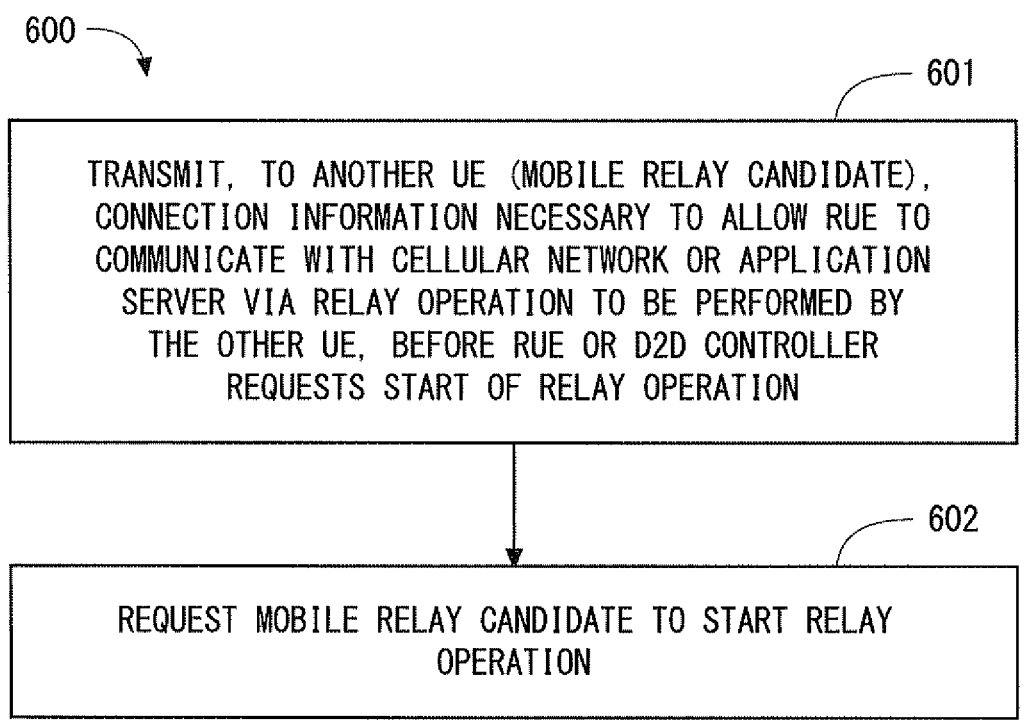
FIG. 6 is a flowchart showing an example of an operation of the remote mobile terminal according to the first embodiment.

FIG. 6 is a flowchart showing an example (process 600) of the operation of the remote UE 1. In block 601, the remote UE (RUE) 1 transmits, to another UE (i.e., the mobile relay (candidate) 2), the connection information necessary to allow the RUE 1 to communicate with the cellular network or the application server 7 via a relay operation to be performed by the other UE (i.e., the mobile relay (candidate) 2), before the RUE 1 or the D2D controller 5 requests a start of the relay operation. The RUE 1 may transmit the connection information to a plurality of mobile relay candidates. The RUE 1 may transmit the connection information to one or more mobile relay candidates via the D2D controller 5. In block 602, the RUE 1 selects a mobile relay candidate to request the relay operation and requests the selected mobile relay candidate to start the relay operation.

Figure 7:
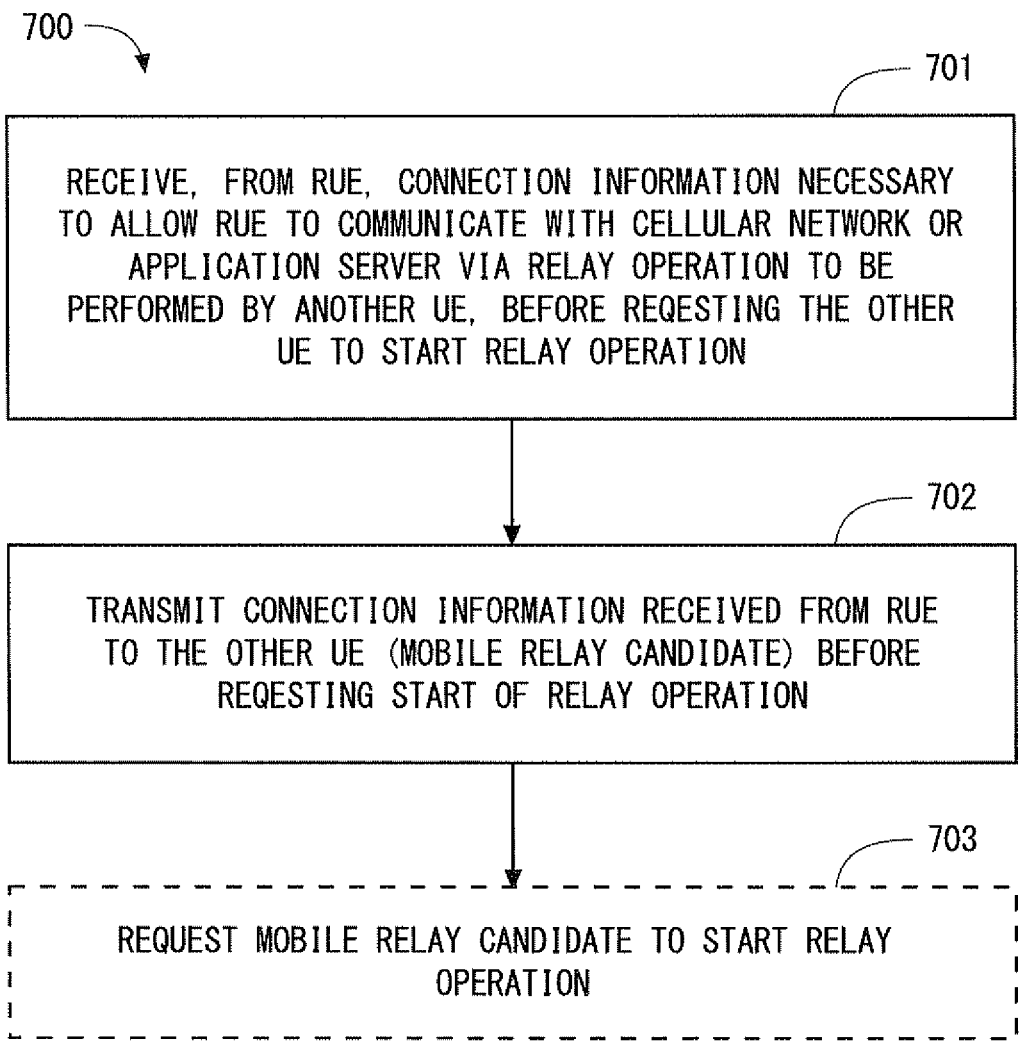
FIG. 7 is a flowchart showing an example of an operation of the D2D controller according to the first embodiment.

FIG. 7 is a flowchart showing an example (operation 700) of the operation of the D2D controller 5. In block 701, the D2D controller 5 receives, from the RUE 1, the connection information necessary to allow the RUE 1 to communicate with the cellular network or the application server 7 via a relay operation to be performed by another UE (i.e., the mobile relay (candidate) 2), before it requests the other UE (i.e., the mobile relay (candidate) 2) to start the relay operation. In block 702, the D2D controller 5 transmits the connection information received from the RUE 1 to the other UE (mobile relay (candidate) 2) before it requests the start of the relay operation. In block 703, the D2D controller 5 selects a mobile relay candidate to request the relay operation for the RUE 1, and requests the selected mobile relay candidate to start the relay operation. When the relay request is made via the D2D communication between the RUE 1 and the mobile relay (candidate) 2, the processing in block 703 shown in FIG. 7 may be omitted.

Second Embodiment

This embodiment provides a modified example of the procedure for starting the relay operation described in the first embodiment. A configuration example of a wireless communication network according to this embodiment is the same as that in FIG. 1.

Figure 8:
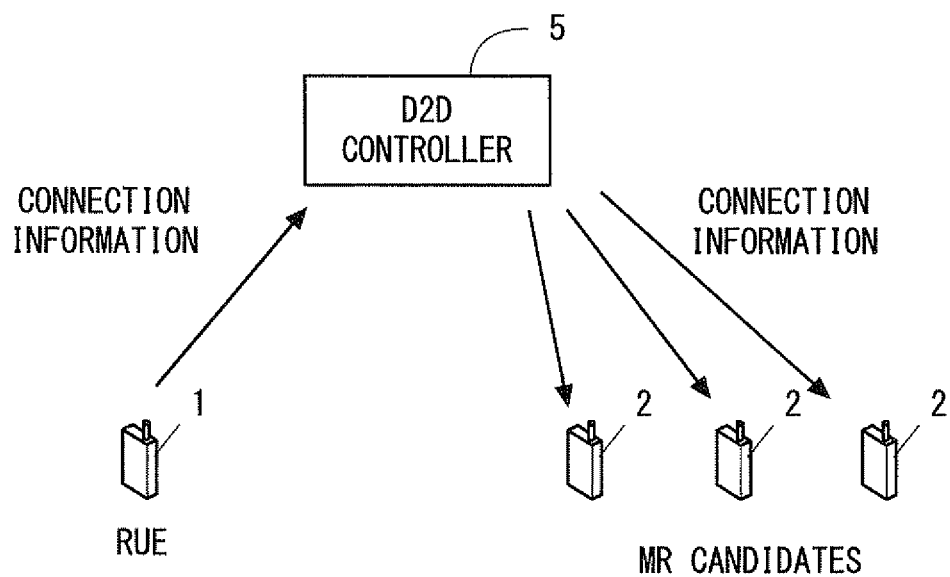
FIG. 8 is a diagram for describing an example of an operation performed by a remote mobile terminal, a mobile relay, and a D2D controller according to a second embodiment.
Figure 9:
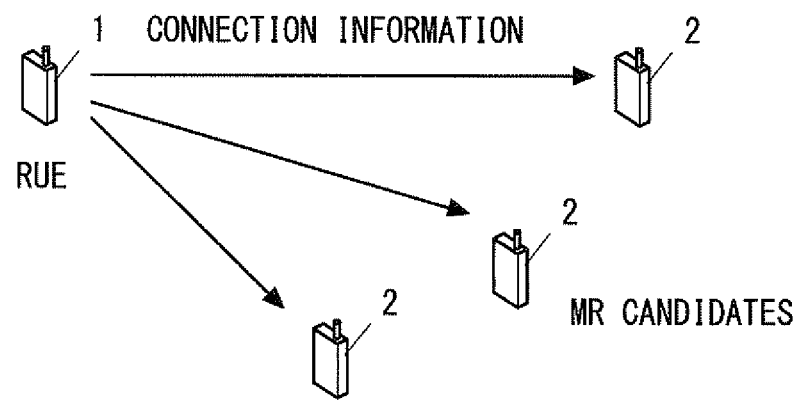
FIG. 9 is a diagram for describing an example of an operation performed by the remote mobile terminal and the mobile relay according to the second embodiment.

In this embodiment, the remote UE 1 or the D2D controller 5 is configured to transmit the connection information to a plurality of mobile relays (candidates) 2 to secure a plurality of relay candidate UEs that prepare in advance for the relay operation for the remote UE 1 in accordance with the connection information. In some implementations, as shown in FIG. 8, the remote UE (RUE) 1 may transmit the connection information to the D2D controller 5, and the D2D controller 5 may forwards the connection information received from the remote UE 1 to a plurality of mobile relays (candidates) 2. In some implementations, as shown in FIG. 9, the remote UE (RUE) 1 may transmit the connection information to a plurality of mobile relays (candidates) 2 directly via the D2D communication.

According to this embodiment, each of the plurality of mobile relays (candidates) 2 can prepare the communication path necessary for the relay operation for the remote UE 1 in accordance with the connection information. As described in the first embodiment, the preparation of the communication path may include at least one of: the bearer activation procedure (or the bearer modification procedure) with the core network 4; and the authentication procedure with the application server 7. The plurality of mobile relays (candidates) 2 prepare in advance the communication path for the relay operation, thereby increasing the probability that the remote UE 1 can be switched from the direct cellular communication to the communication via the mobile relay with low latency.

Third Embodiment

A configuration example of a wireless communication network according to this embodiment is the same as that in FIG. 1. In this embodiment, the D2D controller 5 is configured to add or delete a mobile relay (candidate) 2 so that the number of mobile relays (candidates) 2 that each prepare in advance for the relay operation for the remote UE 1 in accordance with the connection information is greater than or equal to a predetermined number or within a predetermined range.

Figure 10:
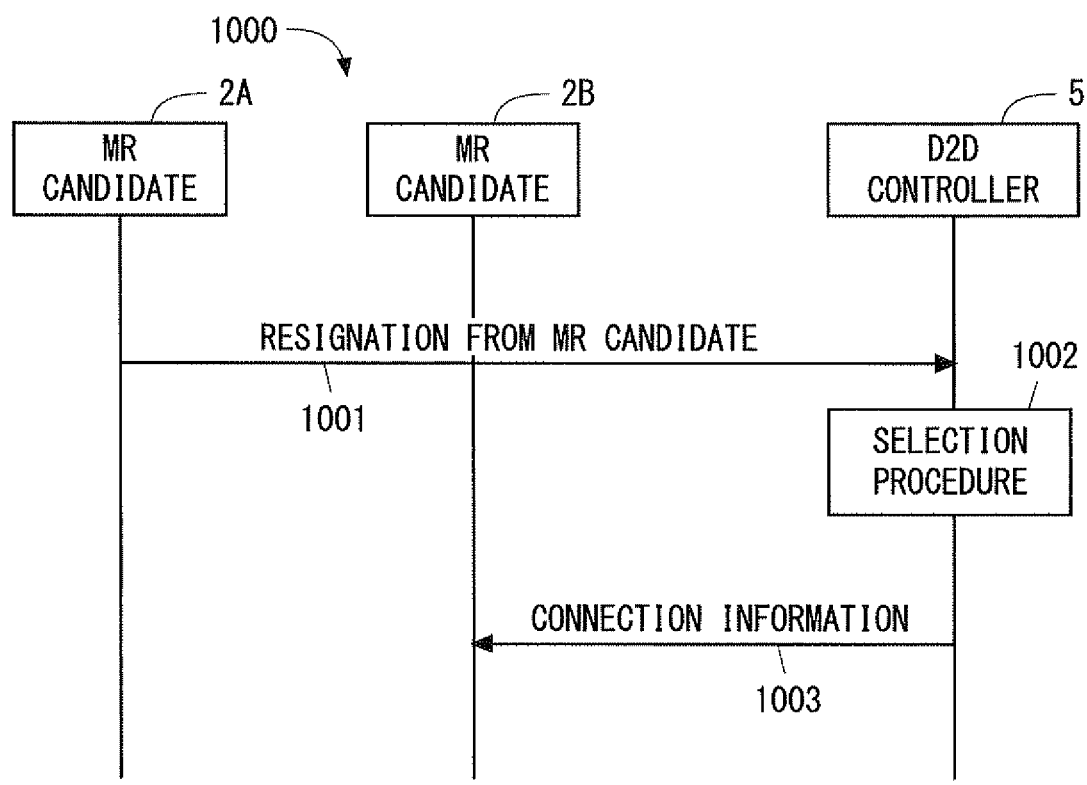
FIG. 10 is a sequence diagram showing an example of a procedure for adding a mobile relay candidate according to a third embodiment.

FIG. 10 is a flowchart showing an example (process 1000) of a procedure related to the addition and deletion of a mobile relay (candidate) 2 according to this embodiment. In FIG. 10, a mobile relay (candidate) 2A is a wireless terminal that has already received the connection information regarding the remote UE 1 and is ready for the relay operation. The mobile relay (candidate) 2A may receive the connection information from the remote UE 1 or the D2D controller 5 according to any one of the procedures described in the first embodiment.

In block 1001, when the mobile relay (candidate) 2A no longer satisfies the requirement of the mobile relay candidate that prepares in advance for the relay operation for the remote UE 1, the mobile relay (candidate) 2A transmits a resignation notification to be resigned from the mobile relay candidates (e.g., resignation from MR candidate) to the D2D controller 5. This resignation notification triggers the D2D controller 5 to add a new mobile relay candidate. For example, the mobile relay (candidate) 2A may transmit the resignation notification in response to detecting that the distance from the remote UE 1 is increased based on the D2D communication quality. Additionally or alternatively, the mobile relay (candidate) 2A may transmit the resignation notification in response to detecting that the cellular communication quality of the mobile relay (candidate) 2A falls below a predetermined threshold. Additionally or alternatively, the mobile relay (candidate) 2A may transmit the resignation notification, when it starts the cellular communication for its own data communication, or when the cellular communication traffic of the mobile relay (candidate) 2A exceeds a threshold, or when another load on the mobile relay (candidate) 2A exceeds a threshold.

In block 1002, in response to receiving the resignation notification from the mobile relay (candidate) 2A, the D2D controller 5 deletes the mobile relay (candidate) 2A from the mobile relay candidates for the remote UE 1 and performs a selection procedure to add a new mobile relay candidate and, accordingly, selects a mobile relay (candidate) 2B as a new mobile relay candidate for the remote UE 1. In block 1003, the D2D controller 5 transmits, to the mobile relay (candidate) 2B, the connection information necessary to allow the RUE 1 to communicate with the cellular network or the application server 7 via the relay operation. As described in the first embodiment, the mobile relay (candidate) 2B may prepare the communication path for the relay operation in accordance with the connection information.

According to the procedure for the addition and deletion of a mobile relay (candidate) 2 described in this embodiment, it is possible to contribute to stably securing one or more mobile relays (candidates) for the remote UE 1.

Fourth Embodiment

This embodiment provides some modified examples of the procedure for adding and deleting a mobile relay (candidate) 2 described in the third embodiment. A configuration example of a wireless communication network according to this embodiment is the same as that in FIG. 1.

In some implementations, the remote UE 1 may be configured to add or delete a mobile relay (candidate) 2 so that the number of mobile relays (candidates) 2 that prepare in advance for the relay operation for the remote UE 1 in accordance with the connection information will become greater than or equal to a predetermined number or within a predetermined range. The remote UE 1 may detect the number of mobile relays (candidates) 2 in proximity of the remote UE 1 by executing the discovery procedure.

The remote UE 1 may autonomously add or delete a mobile relay (candidate) 2 without communicating with the D2D controller 5. Specifically, when a mobile relay (candidate) 2 that was detected in the past cannot be detected in new discovery, the remote UE 1 may select a new mobile relay (candidate) 2 and transmit the connection information to the selected mobile relay (candidate) 2.

Figure 11:
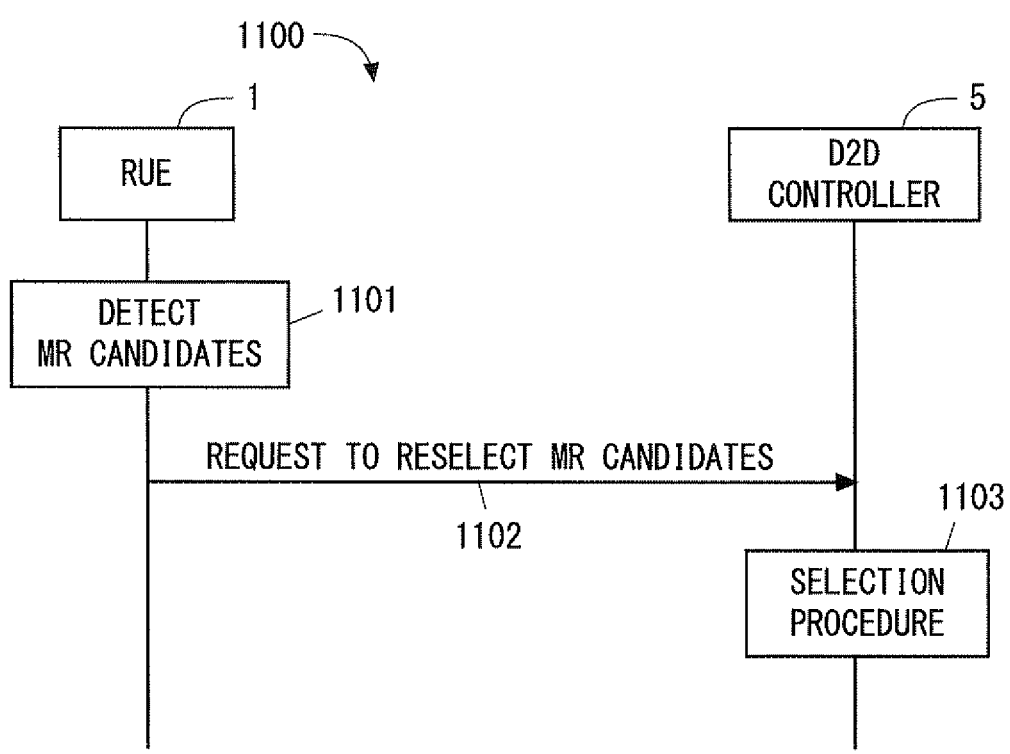
FIG. 11 is a sequence diagram showing an example of a procedure for adding a mobile relay candidate according to a fourth embodiment.

Alternatively, as shown in FIG. 11, the remote UE 1 may communicate with the D2D controller 5 to add or delete the mobile relay (candidate) 2. FIG. 11 is a flowchart showing an example (process 1100) of a procedure related to the addition and deletion of the mobile relay (candidate) 2. In block 1101, the remote UE 1 detects the number of mobile relays (candidates) 2 in proximity of the remote UE 1 by executing the discovery procedure. When the number of detected mobile relays (candidates) 2 falls below a predetermined number or outside a predetermined range, the remote UE 1 requests the D2D controller 5 to reselect a mobile relay (candidate) 2 (1102). In block 1103, the D2D controller 5 performs a procedure for selecting a mobile relay candidate to perform either or both of the addition and deletion of mobile relay candidates. The D2D controller 5 may inform a mobile relay (candidate) 2 to be deleted that it will be resigned from the mobile relay candidates for the remote UE 1. Meanwhile, the D2D controller 5 may transmit the connection information to a mobile relay (candidate) 2 to be added and request this mobile relay (candidate) 2 to prepare for the relay operation based on the connection information.

Figure 12:
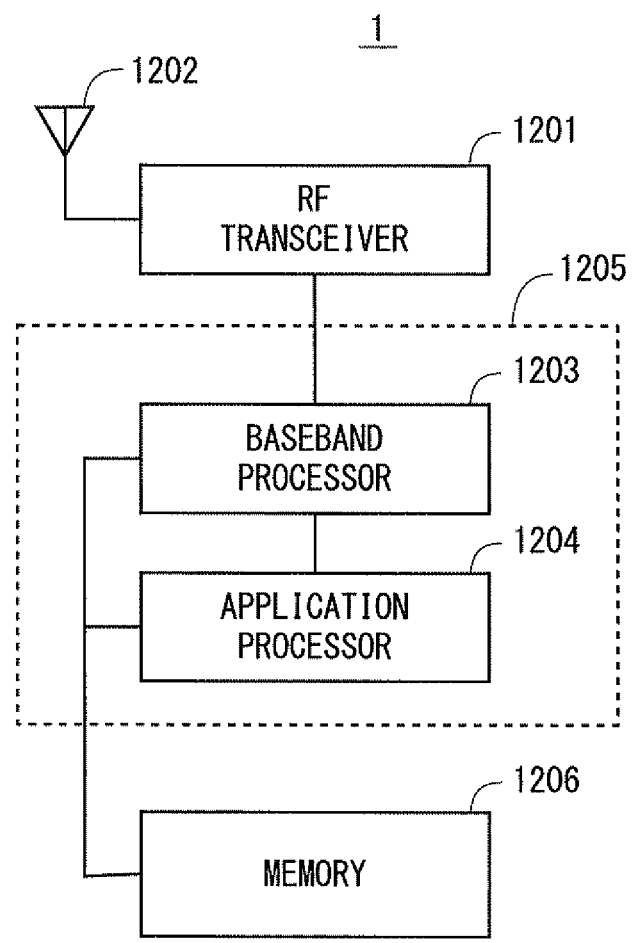
FIG. 12 is a block diagram showing a configuration example of a wireless terminal according to some embodiments.

Lastly, a configuration example of the remote UE 1, the mobile relay 2, and the D2D controller 5 according to the above-described embodiments will be described. FIG. 12 is a block diagram showing a configuration example of the remote UE 1. The mobile relay 2 may also have a configuration similar to that shown in FIG. 12. A Radio Frequency (RF) transceiver 1201 performs analog RF signal processing to communicate with the base station 3. The analog RF signal processing performed by the RF transceiver 1201 includes frequency up-conversion, frequency down-conversion, and amplification. The RF transceiver 1201 is coupled to an antenna 1202 and a baseband processor 1203. That is, the RF transceiver 1201 receives modulated symbol data (or OFDM symbol data) from the baseband processor 1203, generates a transmission RF signal, and supplies the transmission RF signal to the antenna 1202. Moreover, the RF transceiver 1201 generates a baseband reception signal based on a reception RF signal received by the antenna 1202, and supplies the baseband reception signal to the baseband processor 1203.

The baseband processor 1203 performs digital baseband signal processing (i.e., data plane processing) and control plane processing for wireless communication. The digital baseband signal processing includes (a) data compression/decompression, (b) data segmentation/concatenation, (c) generation/decomposition of a transmission format (i.e., transmission frame), (d) transmission channel coding/decoding, (e) modulation (i.e., symbol mapping)/demodulation, (f) generation of OFDM symbol data (baseband OFDM signal) by Inverse Fast Fourier Transform (IFFT), and the like. On the other hand, the control plane processing includes communication management in the layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE and LTE-Advanced, the digital baseband signal processing performed by the baseband processor 1203 may include signal processing of the Packet Data Convergence Protocol (PDCP) layer, Radio Link Control (RLC) layer, MAC layer, and PHY layer. Further, the control plane processing performed by the baseband processor 1203 may include the processing of the Non-Access Stratum (NAS) protocol, RRC protocol, and MAC CE.

The baseband processor 1203 may include a modem processor (e.g., Digital Signal Processor (DSP)) that performs the digital baseband signal processing and a protocol stack processor (e.g., Central Processing Unit (CPU) or Micro Processing Unit (MPU)) that performs the control plane processing. In this case, the protocol stack processor that performs the control plane processing may be integrated with an application processor 1204 described in the following.

The application processor 1204 is also referred to as a CPU, an MPU, a microprocessor, or a processor core. The application processor 1204 may include a plurality of processors (a plurality of processor cores). The application processor 1204 loads a system software program (Operating System (OS)) and various application programs (e.g., voice call application, WEB browser, mailer, camera operation application, and music player application) from a memory 1206 or from another memory (not shown) and executes these programs, thereby providing various functions of the remote UE 1.

In some implementations, as indicated by the dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. A SoC device is sometimes referred to as a system Large Scale Integration (LSI) or a chipset.

The memory 1206 is a volatile memory or a non-volatile memory or a combination thereof. The memory 1206 may include a plurality of physically independent memory devices. The volatile memory is, for example, Static Random Access Memory (SRAM), Dynamic RAM (DRAM), or a combination thereof. The non-volatile memory may be a Mask Read Only Memory (MROM), an Electrically Erasable Programmable ROM (EEPROM), a flash memory, a hard disk drive, or any combination thereof. The memory 1206 may include an external memory device accessible from the baseband processor 1203, the application processor 1204, and the SoC 1205. The memory 1206 may include an internal memory device integrated within the baseband processor 1203, the application processor 1204, or the SoC 1205. The memory 1206 may further include a memory in a Universal Integrated Circuit Card (UICC).

The memory 1206 may store a software module(s) (computer program(s)) including instructions and data to perform processing by the remote UE 1 described in the above described embodiments. In some implementations, the baseband processor 1203 or the application processor 1204 may be configured to load the software module(s) from the memory 1206 and execute the loaded software module(s), thereby performing the processing of the remote UE 1 described in the above described embodiments.

Figure 13:
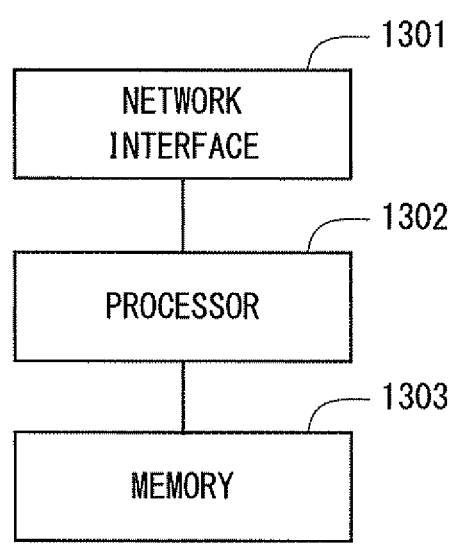
FIG. 13 is a block diagram showing a configuration example of a D2D controller according to some embodiments.

FIG. 13 is a block diagram showing a configuration example of the D2D controller 5 according to the above embodiments. Referring to FIG. 13, the D2D controller 5 includes a network interface 1301, a processor 1302, and a memory 1303. The network interface 1301 is used to communicate with the wireless terminal 1. The network interface 1301 may include, for example, a network interface card (NIC) conforming to the IEEE 802.3 series.

The processor 1302 loads software (computer programs) from the memory 1303 and executes the loaded software, thereby performing the processing of the D2D controller 5 described with reference to the sequence diagrams and the flowcharts in the above embodiments. The processor 1302 may be, for example, a microprocessor, MPU, or CPU. The processor 1302 may include a plurality of processors.

The memory 1303 is composed of a combination of a volatile memory and a non-volatile memory. The memory 1303 may include a storage disposed separately from the processor 1302. In this case, the processor 1302 may access the memory 1303 via an I/O interface not shown.

In the example of FIG. 13, the memory 1303 is used to store software modules including a control module for the D2D communication. The processor 1302 loads these software modules from the memory 1303 and executes the loaded software modules, thereby performing the processing of the D2D controller 5 described in the above embodiments.

As described with reference to FIGS. 12 and 13, each of the processors included in the remote UE 1, the mobile relay 2, and the D2D controller 5 according to the above-described embodiments executes one or more programs including instructions for causing a computer to perform the algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, and semiconductor memories (such as Mask ROM, Programmable ROM (PROM), Erasable PROM (EPROM), flash ROM, Random Access Memory (RAM)). These programs may be provided to a computer using any type of transitory computer readable media. Examples of transitory computer readable media include electric signals, optical signals, and electromagnetic waves. Transitory computer readable media can provide a program to a computer via a wired communication line (e.g. electric wires, and optical fibers) or a wireless communication line.

Other Embodiments

Each of the above embodiments may be used individually, or two or more of the embodiments may be appropriately combined with one another.

Further, the above-described embodiments are merely examples of applications of the technical ideas obtained by the inventors. The technical ideas are not limited to the above-described embodiments, and various changes and modifications may be made thereto.

REFERENCE SIGNS LIST

1 REMOTE UE
2 MOBILE RELAY
3 BASE STATION
4 CORE NETWORK
5 DEVICE-TO-DEVICE (D2D) CONTROLLER
6 EXTERNAL NETWORK
7 APPLICATION SERVER
1201 RADIO FREQUENCY (RF) TRANSCEIVER
1203 BASEBAND PROCESSOR
1204 APPLICATION PROCESSOR
1206 MEMORY
1302 PROCESSOR
1303 MEMORY

The invention claimed is:

1. A wireless terminal apparatus comprising:
at least one wireless transceiver; and
at least one processor configured to perform cellular communication with a cellular network and device-to-device (D2D) communication with another wireless terminal using the at least one wireless transceiver, wherein
the at least one processor is configured to, before the wireless terminal apparatus is requested by the other wireless terminal to start a relay operation between the other wireless terminal and the cellular network, receive, from the other wireless terminal, connection information to allow the other wireless terminal to communicate with the cellular network or with a node in an external network via the relay operation performed by the wireless terminal apparatus, and hold the connection information, and
the at least one processor is configured to transmit, to a D2D controller, a resignation notification to be resigned from a relay terminal candidate, in response to not satisfying a requirement of the relay terminal candidate that prepares in advance for the relay operation in accordance with the connection information.

2. The wireless terminal apparatus according to claim 1, wherein the connection information includes at least one of: (a) configuration information regarding a bearer in the cellular network for transferring a data flow of the other wireless terminal; and (b) configuration information for the wireless terminal apparatus to communicate with the node on an application layer.

3. The wireless terminal apparatus according to claim 2, wherein the connection information specifies at least one of a Quality of Service (QoS) policy of the bearer and a packet filter for the bearer.

4. The wireless terminal apparatus according to claim 2, wherein the connection information includes at least one of an identifier of the node, an address of the node, and authentication information for accessing the node.

5. The wireless terminal apparatus according to claim 1, wherein the at least one processor is configured to, before the wireless terminal apparatus is requested to start the relay operation, perform a bearer activation procedure or bearer modification procedure with the cellular network in accordance with the connection information to prepare a bearer in the cellular network to transfer a data flow of the other wireless terminal.

6. The wireless terminal apparatus according to claim 1, wherein the at least one processor is configured to establish a state capable of communicating with the node in accordance with the connection information before the wireless terminal apparatus is requested to start the relay operation.

7. The wireless terminal apparatus according to claim 1, wherein
the at least one processor is configured to receive the connection information when the wireless terminal apparatus is designated as one of at least one relay terminal candidate for the other wireless terminal and perform, in accordance with the connection information, at least one of: a bearer activation procedure or bearer modification procedure to prepare a bearer in the cellular network to transfer a data flow of the other wireless terminal; and a control procedure for establishing a state capable of communicating with the node on an application layer, and the wireless terminal apparatus is configured to start the relay operation in response to receiving, from the other wireless terminal, a relay start request resulting from the designation of the wireless terminal apparatus as one of the at least one relay terminal candidate.

8. The wireless terminal apparatus according to claim 1, wherein the resignation notification triggers the D2D controller or the other wireless terminal to add a new relay candidate.

9. The wireless terminal apparatus according to claim 1, wherein the at least one processor is configured to transmit the resignation notification in response to detecting that a distance between the wireless terminal apparatus and the other wireless terminal is increased based on a D2D communication quality.

10. The wireless terminal apparatus according to claim 1, wherein the at least one processor is configured to transmit the resignation notification in response to detecting that a cellular communication quality of the wireless terminal apparatus falls below a predetermined treshold.

11. The wireless terminal apparatus according to claim 1, wherein the at least one processor is configured to transmit the resignation notification in response to detecting that cellular communication traffic of the wireless terminal apparatus exceeds a threshold.

12. The wireless terminal apparatus according to claim 1, wherein the at least one processor is configured to transmit the resignation notification in response to detecting that a load on the wireless terminal apparatus exceeds a threshold.

13. A method in a wireless terminal apparatus comprising:
before the wireless terminal apparatus is requested by another wireless terminal to start a relay operation between the other wireless terminal and a cellular network, receiving, from the other terminal, connection information to allow the other wireless terminal to communicate with the cellular network or with a node in an external network via the relay operation performed by the wireless terminal apparatus, and holding the connection information, and
transmitting, to a D2D controller, a resignation notification to be resigned from a relay terminal candidate, in response to not satisfying a requirement of the relay terminal candidate that prepares in advance for the relay operation in accordance with the connection information.

14. The method according to claim 13, wherein the connection information includes at least one of (a) configuration information regarding a bearer in the cellular network for transferring a data flow of the other wireless terminal and (b) configuration information for the wireless terminal apparatus to communicate with the node on an application layer.

15. A relay wireless terminal comprising:
at least one wireless transceiver; and
at least one processor configured to perform cellular communication with a cellular network and device-to-device (D2D) communication with a remote wireless terminal using the at least one wireless transceiver, wherein
the at least one processor is configured to receive, from the remote wireless terminal, connection information to allow the remote wireless terminal to communicate with the cellular network or with a node in an external network via the relay operation performed by the relay wireless terminal,
the at least one processor is configured to receive, from the remote wireless terminal, a request for the relay operation, and
the at least one processor is configured to transmit, to a D2D controller, a resignation notification to be resigned from a relay terminal candidate, in response to not satisfying a requirement of the relay terminal candidate that prepares in advance for the relay operation in accordance with the connection information.

16. A method in a relay wireless terminal comprising:
receiving, from a remote wireless terminal, connection information to allow the remote wireless terminal to communicate with a cellular network or with a node in an external network via the relay operation performed by the relay wireless terminal;
receiving, from the remote wireless terminal, a request for the relay operation, and
transmitting, to a D2D controller, a resignation notification to be resigned from a relay terminal candidate, in response to not satisfying a requirement of the relay terminal candidate that prepares in advance for the relay operation in accordance with the connection information.

* * * * *